US009175369B2

(12) United States Patent
Wu et al.

(10) Patent No.: US 9,175,369 B2
(45) Date of Patent: Nov. 3, 2015

(54) HEAT-RESISTANT COMPONENT

(75) Inventors: Rudder Wu, Ibaraki (JP); Kyoko Kawagishi, Ibaraki (JP); Kazuhide Matsumoto, Ibaraki (JP); Hiroshi Harada, Ibaraki (JP)

(73) Assignee: NATIONAL INSTITUTE FOR MATERIALS SCIENCE, Tsukuba-shi (JP)

( * ) Notice: Subject to any disclaimer, the term of this patent is extended or adjusted under 35 U.S.C. 154(b) by 0 days.

(21) Appl. No.: 13/642,285

(22) PCT Filed: Apr. 14, 2011

(86) PCT No.: PCT/JP2011/059270
§ 371 (c)(1),
(2), (4) Date: Dec. 11, 2012

(87) PCT Pub. No.: WO2011/132596
PCT Pub. Date: Oct. 27, 2011

(65) Prior Publication Data
US 2013/0095346 A1    Apr. 18, 2013

(30) Foreign Application Priority Data

Apr. 20, 2010    (JP) ................. 2010-096554

(51) Int. Cl.
*C22C 19/03* (2006.01)
*C22C 19/05* (2006.01)
(Continued)

(52) U.S. Cl.
CPC ............... *C22C 19/05* (2013.01); *B32B 15/04* (2013.01); *B32B 15/20* (2013.01); *C22C 19/03* (2013.01);
(Continued)

(58) Field of Classification Search
CPC ........ B32B 15/01; B32B 15/04; B32B 15/20; C23C 30/00; C23C 30/005; C23C 26/00; Y10T 428/12944
USPC .................................................. 428/678, 680
See application file for complete search history.

(56) References Cited

U.S. PATENT DOCUMENTS 4,261,742 A * 4/1981 Coupland et al. ............. 420/443
5,455,119 A   10/1995 Taylor et al.
(Continued)

FOREIGN PATENT DOCUMENTS

JP    7-252674 A    10/1995
JP    2002-155380 A    5/2002
(Continued)

OTHER PUBLICATIONS

International Search Report for PCT/JP2011/059270, mailing date of Jul. 19, 2011.
(Continued)

*Primary Examiner* — Michael E La Villa
(74) *Attorney, Agent, or Firm* — Westerman, Hattori, Daniels & Adrian, LLP

(57) ABSTRACT

A Ni-based superalloy component includes a bond coat layer having a chemical composition not allowing interdiffusion to occur on a Ni-base superalloy substrate, and by allowing the bond coat layer to have Pt and/or Ir content equal to or higher than 0.2% but not exceeding 15% by mass, generation of an SRZ, which occurs at an interface between the Ni-base superalloy substrate and the bond coat layer in a high-temperature oxidizing atmosphere, can be suppressed, and at the same time adhesion at the interface between a ceramic thermal barrier coat layer and the bond coat layer is improved. Thus, a long-life Ni-based superalloy component with suppressed elemental interdiffusion between the Ni-base superalloy substrate and the bond coat layer even at temperatures exceeding 1100° C. is provided.

1 Claim, 8 Drawing Sheets

(51) Int. Cl.
  *B32B 15/04*   (2006.01)
  *B32B 15/20*   (2006.01)
  *C23C 30/00*   (2006.01)
  *C23C 26/00*   (2006.01)
  *F01D 5/28*    (2006.01)

(52) U.S. Cl.
  CPC .............. *C23C 26/00* (2013.01); *C23C 30/00* (2013.01); *C23C 30/005* (2013.01); *F01D 5/288* (2013.01); *F05D 2300/177* (2013.01); *Y02T 50/671* (2013.01); *Y10T 428/12944* (2015.01)

(56) References Cited

U.S. PATENT DOCUMENTS

| | | | |
|---|---|---|---|
| 2004/0229075 A1 | 11/2004 | Gleeson et al. | |
| 2007/0071996 A1 | 3/2007 | Hazel et al. | |
| 2008/0003129 A1 | 1/2008 | Gleeson et al. | |
| 2008/0038582 A1 | 2/2008 | Gleeson et al. | |
| 2008/0057337 A1 | 3/2008 | Gleeson et al. | |
| 2008/0057338 A1 | 3/2008 | Gleeson et al. | |
| 2008/0057340 A1 | 3/2008 | Gleeson et al. | |
| 2008/0163784 A1 | 7/2008 | Hardwicke et al. | |
| 2008/0163785 A1 | 7/2008 | Hardwicke et al. | |
| 2008/0163786 A1 | 7/2008 | Feng et al. | |
| 2009/0274928 A1* | 11/2009 | Harada et al. | 428/680 |
| 2009/0317658 A1 | 12/2009 | Narita | |

FOREIGN PATENT DOCUMENTS

| | | | |
|---|---|---|---|
| JP | 2002-180231 A | 6/2002 |
| JP | 3862774 B2 | 12/2006 |
| JP | 2007-503530 A | 2/2007 |
| JP | 2007-092168 A | 4/2007 |
| JP | 2008-156697 A | 7/2008 |
| JP | 2008-156744 A | 7/2008 |
| JP | 2008-168345 A | 7/2008 |
| JP | 2008-168346 A | 7/2008 |
| JP | 2008-169481 A | 7/2008 |
| JP | 4111555 B2 | 7/2008 |
| WO | 2006/104138 A1 | 10/2006 |

OTHER PUBLICATIONS

Office Action dated May 7, 2014, issued in Japanese Patent Application No. 2010-096554 (4 pages).

* cited by examiner (A)

(B)

(A)

(B)

(A)

(B)

(A)

(B)

(C)

(A)

(B)

(C)

(A)

(B)

(C)

HEAT-RESISTANT COMPONENT

TECHNICAL FIELD

The present invention relates to a heat-resistant component. More specifically, the present invention relates to a heat-resistant component with improved environmental resistance, including resistance to oxidation and high-temperature corrosion, and improved high-temperature long-term durability to be used under high-temperature and high-stress conditions, such as turbine rotor blades and turbine stator blades for jet engines and industrial gas turbines.

BACKGROUND ART

As heat-resistant components for turbine rotor blades and turbine stator blades for jet engines and industrial gas turbines, Ni-based superalloys with improved heatproof temperature have been developed. With these heat-resistant components for turbine rotor blades and turbine stator blades, to further improve durability, a ceramic thermal barrier coating is widely used. Furthermore, to promote adhesion of the ceramic thermal barrier coating to Ni-based superalloy jet engine parts and prolong parts life, a number of highly oxidation-resistant bond coat materials have been proposed for use between a Ni-based superalloy component and a ceramic thermal barrier coating material. These bond coating materials are, in most cases, Al-containing alloys such as Ni- or Co-aluminide, MCrAlY (M is at least one metal selected from Ni, Co and Fe), and platinum-aluminide (Patent Literatures 1 to 4).

However, if a turbine blade made of a Ni-based superalloy adopting these bond coat materials is used at a high temperature for a long time, elemental interdiffusion progresses in proximity to the interface between the Ni-base superalloy substrate and the bond coat material and/or between the ceramic thermal barrier coat material and the bond coat material. Consequently, material technological problems, such as material degradation and decrease in durability of the Ni-based superalloy and decrease in durability of the bond coat material, arise, resulting in decrease in durability of turbine blades themselves. In particular, since gas temperature of jet engines and gas turbines has recently been increasing, turbine blade temperature is also increasing, thereby further accelerating the occurrence of a phenomenon of elemental interdiffusion. In addition, high-pressure turbine blades have a hollow structure to facilitate cooling, and because thinning is progressing, suppression of elemental interdiffusion is becoming an increasingly significant technical challenge.

To suppress elemental interdiffusion in the proximity of the interface between a Ni-based superalloy substrate and a bond coat material, a diffusion barrier coating has been studied, but sufficient effect has yet to be obtained.

Paying attention to the fact that elemental interdiffusion occurs, thereby causing Ni-base superalloy substrate to degrade, because the alloy composition of the Ni-base superalloy substrate and that of the bond coat material are not in a state of thermodynamic equilibrium, the inventors have proposed to use an alloy that is in a state of thermodynamic equilibrium with a Ni-base superalloy substrate as a bond coat material(hereinafter referred to as EQ coat material). Specifically, it has been clarified that by coating one or more layers containing at least one of $\gamma$ phase, $\gamma'$ phase, and B2 phase having a composition that is in a state of thermodynamic equilibrium with the Ni-base superalloy substrate on the Ni-base superalloy substrate, elemental diffusion is suppressed significantly, and that degradation of the coated Ni-based superalloy can thus be suppressed (Patent Literature 5).

In the case heat-resistant gas turbine components using a Ni-based superalloy as a substrate, in order to increase heat resistance of the Ni-base superalloy substrate, currently, a ceramic thermal barrier coat layer is coated on the surface of the substrate. However, since long-term adhesion property of the interface between the Ni-base superalloy substrate and the ceramic thermal barrier coat layer is insufficient, the Ni-base superalloy substrate and the ceramic thermal barrier coat layer are bonded via a bond coat layer. The bond coat layer is made of a bond coat material. Of various bond coat materials that have thus far been proposed, EQ coat material is an excellent bond coat material capable of suppressing generation of a secondary reaction zone (SRZ), which occurs in proximity to the interface between the Ni-base superalloy substrate and the bond coat layer. However, even if the EQ coat material is used, detachment of ceramic coat layer occurs as a result of generation of an oxide layer under high-temperature oxidizing conditions in proximity to the interface between the ceramic thermal barrier coat layer and the EQ coat material. Thus, the life of Ni-based superalloy components is not necessarily considered to be sufficient.

CITATION LIST

Patent Literature

Patent Literature 1: JP 4111555 B
Patent Literature 2: JP 2008-156744 A
Patent Literature 3: JP 2002-155380 A
Patent Literature 4: JP 3862774 B
Patent Literature 5: WO 2006/104138

SUMMARY OF INVENTION

Technical Problem

The objective of the present invention is to suppress generation of a secondary reaction zone (SRZ) that occurs in proximity to the interface between a Ni-base superalloy substrate and a bond coat layer in a high-temperature oxidizing atmosphere, and improve adhesion at the interface between a ceramic thermal barrier coat layer and the bond coat layer, thereby providing a long-life Ni-based superalloy component.

Solution to Problem

After a great deal of earnest consideration, the inventors found that by mixing platinum (Pt) and/or iridium (Ir) into the EQ coat material forming a bond coat layer, which had been proposed by the inventors, thermal cycling life, namely the duration until detachment of ceramic thermal barrier coat material starts to occur, can be improved significantly. In other words, by mixing Pt and/or Ir in the EQ coat material, a homogeneous and dense oxide layer is generated in proximity to the interface between the ceramic thermal barrier coat and the EQ coat layer, which improves the stability and adhesion of the oxide layer significantly.

By using a bond coat material containing Pt and/or Ir of the present invention, generation of an SRZ in proximity to the interface between the Ni-based superalloy substrate and the bond coat layer was inhibited, and in addition, adhesion between the ceramic thermal barrier coat layer and the bond coat layer, which had been a task to be solved, also improved significantly. The thermal cycling life of Ni-based superalloy components has thus been prolonged. Furthermore, the bond coat material containing Pt and/or Ir of the present invention generates homogeneous, dense, and stable oxide layer on its surface in a high-temperature oxidizing atmosphere. Consequently, the life of a Ni-based superalloy component with no ceramic thermal barrier coat layer formed thereon could also be prolonged, provided that it is not used under severe temperature conditions.

In other words, firstly, the present invention is characterized in that as a means to solve the above problem, a Ni-based superalloy component including a bond coat layer that has a chemical composition not allowing interdiffusion to occur on the Ni-base superalloy substrate is provided, and that the bond coat layer has Pt and/or Ir content equal to or higher than 0.2% but not exceeding 15% by mass.

Secondly, the present invention is characterized in that the bond coat layer contains at least one of γ phase, γ' phase, and B2 phase, which have a composition achieving thermodynamic equilibrium with the Ni-based superalloy.

Thirdly, the present invention is characterized in that the bond coat layer has Al content equal to or higher than 2.9% but not exceeding 16.0% by mass and Cr content equal to or higher than 0% but not exceeding 19.6% by mass.

Fourthly, the present invention is characterized in that the bond coat layer has Al content equal to or higher than 6.1% but not exceeding 10.6% by mass, and Cr content equal to or higher than 0.4% but not exceeding 14.0% by mass.

Fifthly, the present invention is characterized in that the bond coat layer contains a γ' phase having a composition that is in thermodynamic equilibrium with the Ni-base superalloy substrate.

Sixthly, the present invention is characterized in that the bond coat layer has Pt and/or Ir content equal to or higher than 0.5% but not exceeding 10% by mass.

Seventhly, the present invention is characterized in that the composition of the Ni-base superalloy substrate is as follows: Al content; from 1.0% to 10.0% by mass, Ta content; from 0% to 14.0% by mass, Mo content; from 0% to 10.0% by mass, W content; from 0% to 15.0% by mass, Re content; from 0% to 10.0% by mass, Hf content; from 0% to 3.0% by mass, Cr content; from 0% to 20.0% by mass, Co content; from 0% to 20% by mass, Ru content; from 0% to 14.0% by mass, Nb content; from 0% to 4.0% by mass, Si content; from 0% to 2.0% by mass, and the remaining percentage is represented by Ni and inevitable impurities.

Eighthly, the present invention is characterized in that the composition of the Ni-base superalloy substrate is as follows: Al content; from 3.5% to 7.0% by mass, Ta content; from 2.0% to 12.0% by mass, Mo content; from 0% to 4.5% by mass, W content; from 0% to 10.0% by mass, Re content; from 0% to 8.0% by mass, Hf content; from 0% to 0.50% by mass, Cr content; from 1.0% to 15.0% by mass, Co content; from 2% to 16% by mass, Ru content; from 0% to 14.0% by mass, Nb content; from 0% to 2.0% by mass, Si content; from 0% to 2.0% by mass, and the remaining percentage is represented by Ni and inevitable impurities.

Ninthly, the present invention is characterized in that a heat-resistant gas turbine component is manufactured using a Ni-based superalloy component that is created by forming a layer of a bond coat material containing Pt and/or Ir on a Ni-base superalloy substrate.

Tenthly, the present invention is characterized in that a bond coat material made of a Ni-based alloy has an Al content equal to or higher than 2.9% but not exceeding 16.0% by mass, Cr content equal to or higher than 0% but not exceeding 19.6% by mass, and Pt and/or Ir content equal to or higher than 0.2% but not exceeding 15% by mass.

Advantageous Effect of Invention

The Ni-based superalloy component of the present invention remains stable in proximity to the interface between the bond coat layer containing Pt and/or Ir and the ceramic thermal barrier coat layer even under high-temperature conditions of equal to or higher than 1,100° C. in the presence of air. In addition, since the alloy compositions of the bond coat material of the present invention and Ni-base superalloy substrate are in a state of approximate thermodynamic equilibrium, elemental interdiffusion that occurs in proximity to the interface is suppressed, and stability of the interface at high temperatures is also maintained. Consequently, by using the Ni-based alloy component made up of a Ni-base superalloy substrate, a bond coat layer containing Pt and/or Ir, and a ceramic thermal barrier coat layer as gas turbine materials, the high-temperature thermal cycling durability of gas turbine components can be improved significantly.

DESCRIPTION OF EMBODIMENTS

The Ni-based superalloy component of the present invention is a Ni-based superalloy component including a bond coat layer having chemical composition that does not allow interdiffusion to occur on a Ni-base superalloy substrate, and the bond coat layer has Pt and/or Ir content equal to or higher than 0.2% but not exceeding 15% by mass.

Figure 1:
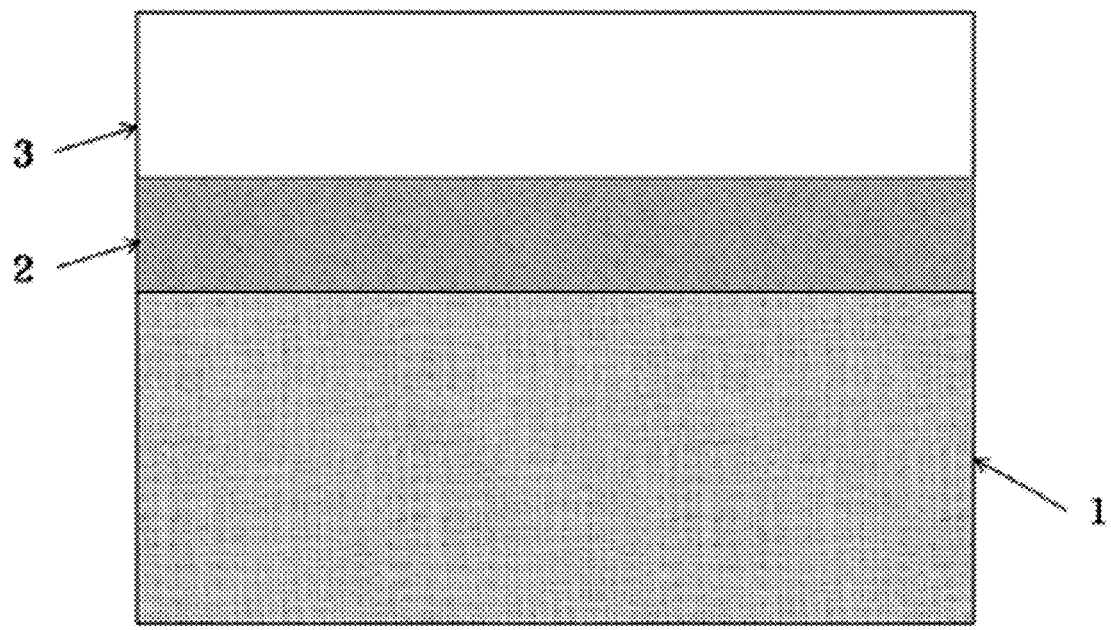
FIG. 1 is a cross-sectional view of a Ni-based superalloy component of the present invention.

A Ni-based superalloy component is generally in a three-layer structure made up of a Ni-base superalloy substrate 1, a bond coat layer formed on the Ni-base superalloy substrate 1, and a ceramic thermal barrier coat layer formed on the bond coat layer. FIG. 1 illustrates a Ni-based superalloy component in three-layer structure of the present invention. The Ni-based superalloy component has a bond coat layer 2, which has chemical composition that does not allow interdiffusion with the Ni-base superalloy substrate 1 to occur and contains Pt and/or Ir, on the Ni-base superalloy substrate 1, and a ceramic thermal barrier coat layer 3 is formed on the bond coat layer.

It is also possible to create a Ni-based superalloy component in two-layer structure by forming a bond coat layer containing Pt and/or Ir on a Ni-based superalloy substrate 1 without forming a ceramic thermal barrier coat layer 3. The bond coat layer 2 containing Pt and/or Ir generates a quite stable oxide layer on its surface in a high-temperature oxidizing atmosphere. Consequently, the life of even a Ni-based superalloy component in two-layer structure can be prolonged, provided that it is not used under severe temperature conditions.

A wide range of alloys, including generally used Ni-based superalloys in the first to the third generations and the fourth and fifth-generation alloys containing Re and Ru that have recently been developed vigorously can be used as the Ni-base superalloy substrate 1.

Ni-based superalloys include those having following compositions: Al content; from 1.0% to 10.0% by mass, Ta content; from 0% to 14.0% by mass, Mo content; from 0% to 10.0% by mass, W content; from 0% to 15.0% by mass, Re content; from 0% to 10.0% by mass, Hf content; from 0% to 3.0% by mass, Cr content; from 0% to 20.0% by mass, Co content; from 0% to 20% by mass, Ru content; from 0% to 14.0% by mass, Nb content; from 0% to 4.0% by mass, Si content; from 0% to 2.0% by mass, and the remaining percentage is represented by Ni and inevitable impurities.

Preferably, alloys having the following compositions can be exemplified: Al content; from 3.5% to 7.0% by mass, Ta content; from 2.0% to 12.0% by mass, Mo content; from 0% to 4.5% by mass, W content; from 0% to 10.0% by mass, Re content; from 0% to 8.0% by mass, Hf content; from 0% to 0.50% by mass, Cr content; from 1.0% to 15.0% by mass, Co content; from 2% to 16% by mass, Ru content; from 0% to 14.0% by mass, Nb content; from 0% to 2.0% by mass, Si content; from 0% to 2.0%, by mass and the remaining percentage is represented by Ni and inevitable impurities.

Note that not only the Ni-based superalloys presented above but also an extremely wide range of Ni-based superalloys are applicable, provided that the intentions of the present invention are satisfied.

The Ni-base superalloy substrate 1 and the bond coat layer 2 are practically in a state of thermodynamic equilibrium or near-equilibrium. Being in a state of thermodynamic equilibrium is defined theoretically as a state where chemical potential, etc. are equal. Describing that state using an alloy material including a Ni-based superalloy and a bond coat material, the chemical potential $\mu_i$ of component i in a multi-component alloy is represented by the following formula:

$$\mu_i = \mu_i^0 + RT \ln \frac{P_i}{P_i^0} \qquad \text{[Formula 1]}$$

where, $\mu_i^0$ is free energy of component i in normal state, $P_i^0$ is vapor pressure of pure substance i, $P_i$ is partial pressure of component i on a mixture, R is a gas constant, and T is a temperature. When two phases are in a state of thermodynamic equilibrium, each phase has an equal $\mu_i$ value.

Elemental diffusion that occurs at an interface between the bond coat layer 2 and the Ni-base superalloy substrate 1 is caused by a difference in chemical potential. Consequently, if the chemical potential of element i in the bond coat layer 2 and that in the Ni-base superalloy substrate 1 are equal, diffusion of i at the interface, which is dependent on the difference in chemical potential, does not occur.

The bond coat layer 2 is in a state of thermodynamic equilibrium with the Ni-base superalloy substrate. The bond coat layer 2 according to the present invention is made of a coat material having a composition unsusceptible to elemental interdiffusion with the Ni-base superalloy substrate, which will be described later, such as an alloy manufactured by adding Pt and/or Ir in content equal to or higher than 0.2% but not exceeding 15% by mass to the composition of EQ coat material.

The bond coat layer made of a bond coat material formed by allowing a substance having a composition unsusceptible to elemental interdiffusion with the Ni-based superalloy substrate to contain Pt and/or Ir in content equal to or higher than 0.2% but not exceeding 15% by mass is further unsusceptible to elemental diffusion with the Ni-based superalloy, and in addition, has improved heat resistance against detachment from the ceramic thermal barrier coat layer.

If the Pt and/or Ir content is lower than 0.2% by mass, the effect of improving thermal cycling life of the Ni-based superalloy component diminishes. Furthermore, since Pt and Ir are expensive elements, the cost surges, making it impracticable, if the content is higher than 15% by mass. The content preferably falls within a range from 0.5% to 10%, more preferably from 5% to 10%, by mass.

As described above, the bond coat layer 2 is practically in a state of equilibrium, or near-equilibrium, with the Ni-base superalloy substrate, rarely causing interdiffusion with the Ni-base superalloy substrate to occur.

The Ni-based superalloy component according to the present invention is a highly durable alloy having excellent heat resistance, and is characterized in that it is in a two-layer structure made up of γ phase and γ' phase. Consequently, to achieve a state of thermodynamic equilibrium wherein elemental diffusion in the bond coat layer 2 is suppressed, the following conditions must be satisfied:

(1) The bond coat layer 2 contains at least one of γ phase and γ' phase at a given temperature; and
(2) The bond coat layer 2 suppresses generation of a diffusion-altered layer in proximity to the interface with the Ni-base superalloy substrate. In particular, at least one of the following two is satisfied: generation of a single phase or deposition of a third phase from the two-layer structure made up of the γ phase and γ' phase of the Ni-base superalloy substrate is suppressed, and generation of an altered layer resulting from a change in abundance of the γ' phase is suppressed.

Generally, Al, which diffuses rapidly and is an element necessary to increase resistance to oxidation, is an important component essential for a bond coat layer. The next important component is Cr, which affects the resistance to oxidation. Hafnium (Hf) does not play an important role in generation of an altered layer because of its low concentration, and thus can be decreased or eliminated. Since tantalum (Ta), molybdenum (Mo), tungsten (W), ruthenium (Ru), and rhenium (Re) included in Ni-base superalloy substrate diffuse relatively slowly, they scarcely affect generation of an altered layer resulting from interdiffusion, and thus can be decreased or eliminated. Since these substances are expensive, by decreasing their quantities, the price of the bond coat material can be reduced. Namely, it is only necessary that at least one of γ phase, γ' phase, and B2 phase is contained as a bond coat layer. Even if the elements such as Ru and Re, which diffuse relatively slowly, are reduced, the effect of the bond coat layer 2 is scarcely affected.

In other words, the bond coat layer has Al content equal to or higher than 2.9% but not exceeding 16.0% by mass, Cr content equal to or higher than 0% but not exceeding 19.6% by mass, content of at least one of Pt and Ir equal to or higher than 0.2% but not exceeding 15% by mass, and the remaining percentage is represented by Ni and inevitable impurities. Preferably, it has Al content equal to or higher than 6.1% but not exceeding 10.6% by mass, Cr content equal to or higher than 0.4% but not exceeding 14.0% by mass, content of at least one of Pt and Ir equal to or higher than 0.2% but not exceeding 15% by mass, and the remaining percentage is represented by Ni and inevitable impurities. Note that bond coat layer compositions other than those presented above are applicable, provided that the intentions of the present invention are satisfied.

The bond coat layer 2 is made of a bond coat material having a composition that scarcely allows interdiffusion with Ni-base superalloy substrate to occur. Bond coat materials of any compositions can be used, provided that they are alloys that achieve thermodynamic equilibrium with the Ni-base superalloy substrate and have the same composition as the bond coat layer 2. For example, Pt and/or Ir may be added to the composition of one of γ phase, γ' phase, and B2 phase of the Ni-base superalloy substrate. Note that Ru and/or Re, which diffuse(s) relatively slowly, contained in the composition of γ phase, γ' phase, and B2 phase need not be contained.

More specifically, the bond coat material has Al content equal to or higher than 2.9% but not exceeding 16.0% by mass, Cr content equal to or higher than 0% but not exceeding 19.6% by mass, and Pt and/or Ir content equal to or higher than 0.2% but not exceeding 15% by mass, and the remaining percentage is represented by Ni and inevitable impurities. Preferably, it has Al content equal to or higher than 6.1% but not exceeding 10.6% by mass, Cr content equal to or higher than 0.4% but not exceeding 14.0% by mass, and the remaining percentage is represented by Ni and inevitable impurities.

As part of the remaining percentage, components other than Ni, Al, and Cr, which are contained in the composition of one of γ phase, γ' phase, and B2 phase of the Ni-base superalloy substrate, such as Co, Ta, Mo, W, Ta, and Hf, may be contained.

As described above, Hf concentration is low, and thus Hf does not play an important role in the generation of an altered layer, it can be decreased. or eliminated Since Ta, Mo, and W diffuse relatively slowly, they scarcely affect the generation of an altered layer due to interdiffusion, and thus they can be decreased or eliminated.

If Pt and/or Ir content is lower than 0.2% by mass, the effect of prolonging thermal cycling life of the Ni-based superalloy member diminishes. In addition, since Pt and Ir are expensive elements, cost surges if their content is higher than 15% by mass, making the use impracticable. Their content is further preferably equal to or higher than 5% but not exceeding 10% by mass.

As described above, the bond coat material has a composition containing Pt and/or Ir, in addition to Al and Cr, and the remaining percentage is represented by Ni and inevitable impurities, and Ru and/or Re, which diffuse(s) relatively slowly, are not necessarily contained.

In addition, it is preferable that Y is contained in the bond coat material in order to ensure a thermally grown oxide (TGO) layer is generated as a result of natural oxidation of the bond coat surface, thereby improving adhesion. Preferable content is 0.1% or lower by mass. Note, however, that Y need not be contained if Y is not contained in the Ni-base superalloy substrate.

The bond coat layer 2 can be formed on a Ni-base superalloy substrate using a bond coat material by the methods generally used, such as plasma spraying, high velocity flame spraying, ion plating, EB-PVD, and CVD methods, and not limited to specific techniques. The thickness of the bond coat layer 2 falls within a range from 5 to 500 μm, more preferably a range from 10 to 400 μm.

The ceramic thermal barrier coat layer 3 can be formed on the bond coat layer using a ceramic material recognized to have thermal shield effect by a method such as the EB-PVD method and the flame spray method. The thickness of the ceramic thermal barrier coat layer falls within a range from 5 to 500 μm, more preferably a range from 10 to 400 μm. Typical ceramic materials recognized to have thermal shield effect include, but not limited to, partially-stabilized zirconia ($ZrO_2$). To prevent cracking resulting from expansion/contraction due to phase transformation, ceramic materials having been partially or completely stabilized by allowing them to contain at least one oxide selected from $Y_2O_3$, $CeO_2$, and MgO are used preferably. Partially-stabilized $ZrO_2$ having $Y_2O_3$ content of 7% to 8% by mass, in particular, is widely used as a ceramic material having excellent heat resistance property.

By forming a ceramic thermal shield coat layer 3 on a bond coat layer 2, to which Pt and/or Ir are/is added, the interface between the ceramic shield coat layer 3 and the bond coat layer 2 remains extremely stable even if used at high temperatures for a long time. Furthermore, thanks to the composition that scarcely allows interdiffusion with Ni-base superalloy substrate to occur, the durability of Ni-based heat-resistant component is improved significantly.

EXAMPLES

The Ni-based superalloy component of the present invention will hereinafter be described by referring to examples.

A forth-generation Ni-based monocrystal superalloy (TMS-138A) proposed by the inventors was selected as an alloy base material.

The alloy composition of molten metal was adjusted using a vacuum melting furnace, and Ni-based monocrystal superalloy ingots were cast. Table 1 lists the compositions of the cast alloys. Alloy ingots used to form a bond coat layer were manufactured in the same manner. Table 1 lists the compositions of the ingots manufactured.

The base alloy composition of the ingots used for the bond coat layer is based on the composition of the γ' phase of the above-mentioned fourth-generation Ni-based monocrystal superalloy (TMS-138A), with elements Re and Ru, which are very expensive, excluded from the alloy component (hereinafter referred to as EQC). The bond coat material of the present invention is formed by adding Pt or Ir to this base composition, EQC, by 5% by mass.

TABLE 1

| | Alloy element (% by mass) | | | | | | | | | | | | |
|---|---|---|---|---|---|---|---|---|---|---|---|---|---|
| | Co | Cr | Mo | W | Al | Ta | Hf | Re | Ru | Y | Pt | Ir | Ni |
| Ni-based mono-crystal superalloy (TMS-138A) | 5.8 | 3.2 | 2.8 | 2.8 | 5.7 | 5.6 | 0.1 | 5.8 | 3.6 | — | — | — | Rest |
| EQC coat material | 6.2 | 4.0 | 1.0 | 1.0 | 8.1 | 9.9 | 0.4 | — | — | 0.1 | — | — | Rest |
| EQC-Pt coat material | 6.2 | 4.0 | 1.0 | 1.0 | 8.1 | 9.9 | 0.4 | — | — | 0.1 | 5.0 | — | Rest |
| EQC-Ir coat material | 6.2 | 4.0 | 1.0 | 1.0 | 8.1 | 9.9 | 0.4 | — | — | 0.1 | | 5.0 | Rest |

Using three types of bond coat materials shown in Table 1, namely EQC, EQC-Pt, and EQC-Ir, bond coat layers of a thickness of 150 μm were formed on the surface of Ni-based monocrystal superalloy (TMS-138A). Furthermore, the bond coat layers were coated with partially-stabilized $ZrO_2$ containing 7% $Y_2O_3$ by mass using the EB-PVD method to form ceramic thermal barrier coat layers of approximately 175 μm. Samples made of the Ni-based monocrystal superalloy, bond coat layer, and ceramic thermal barrier coat layer were thus manufactured.

Figure 2:
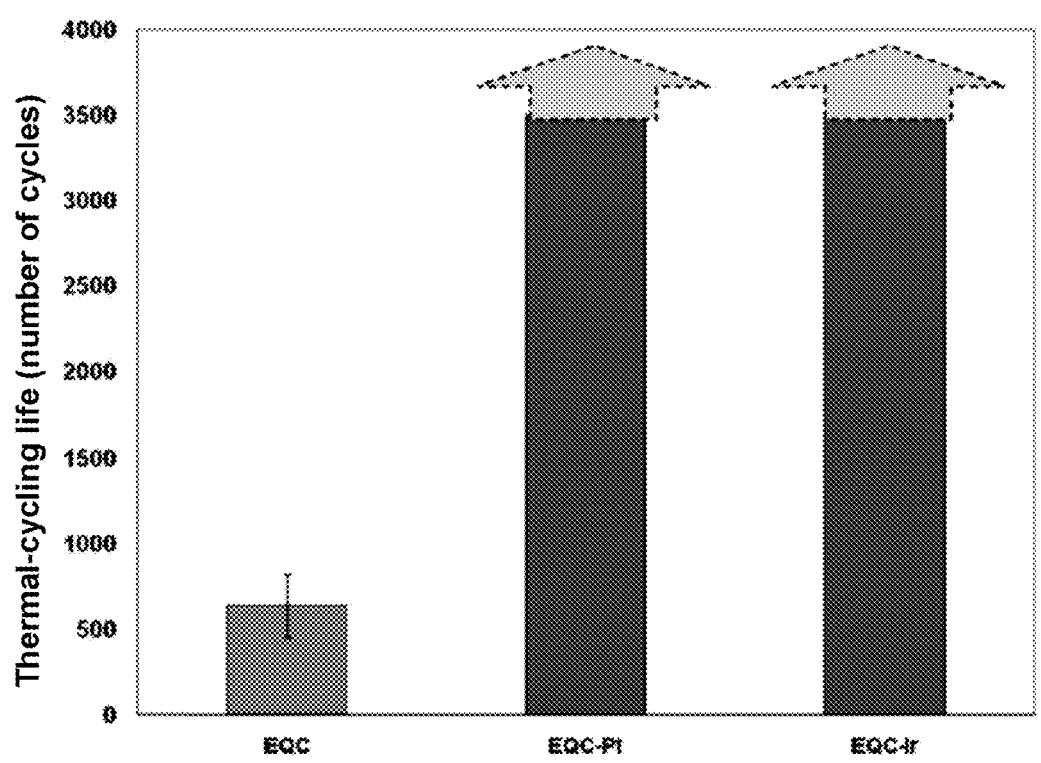
FIG. 2 is a chart showing the thermal cycling life of samples having undergone a cycle test, wherein a laminated body created by forming a ceramic thermal barrier layer on a bond coat layer made of a bond coat material of the present invention was heated at 1,135° C. for one hour and then left at a room temperature for one hour.

FIG. 2 is a chart showing the thermal cycling life of each sample obtained by performing durability tests under the cycle conditions of 1,135° C. for one hour, using a sample that has EQC coat material as a bond coat layer (Comparative Example) and samples that respectively have EQC-Pt coat material and EQC-Ir coat material as bond coat layers, which are the bond coat materials of the present invention, manufactured by the method described above.

With the EQC coat material in Comparative Example, approximately one-fourth of the ceramic thermal barrier layer was confirmed to have been detached from the bond coat layer at around 520 cycles. Meanwhile, with the samples using EQC-Pt and EQC-Ir coat materials of the present invention, practically no detachment of the ceramic thermal barrier layer was found even after 3,500 cycles. Namely, the samples having the bond coat layer made of EQC coat material containing Pt or Ir were found to have life seven times as long as or longer than the sample having the bond coat layer made of EQC coat material.

Note that yttrium (Y) is contained in the bond coat material in this example. Y has an effect of improving adhesion when the bond coat layer turns into a bond coat layer having a thermally grown oxide (TGO) as a result of natural oxidation. It is therefore desirable that Y be contained in the bond coat material in content of 0.1% or lower by mass. When Y is not contained in the Ni-base superalloy substrate, Y need not be contained in the bond coat material because Y is not contained in thermodynamic equilibrium composition.

Figure 3:
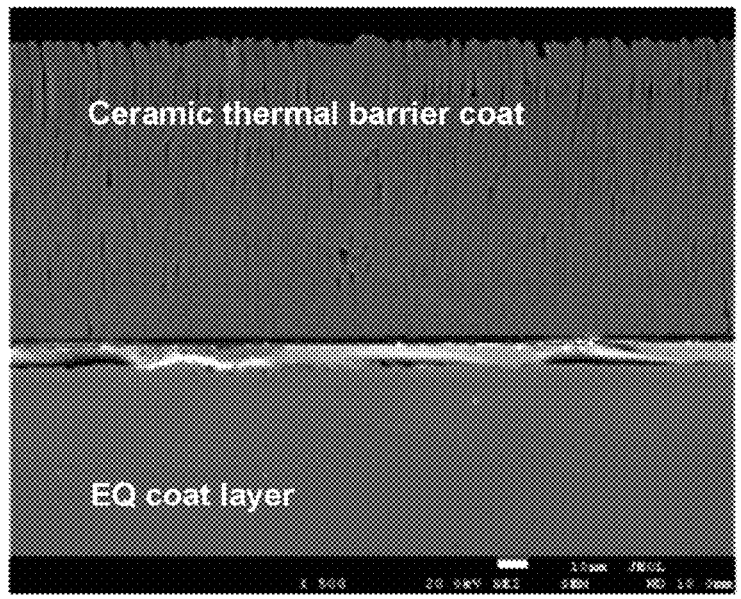
FIG. 3 provides scanning electron microscopic images of a cross section of a sample having undergone an oxidation resistance test, wherein a laminated body created by forming a ceramic thermal barrier layer on a bond coat layer made of an EQ-Pt coat material of the present invention was subjected to 1,135° C. and 100-cycle oxidation resistance test. (A) is an image magnified 500 times, and (B) is an image magnified 4000 times.
Figure 3:
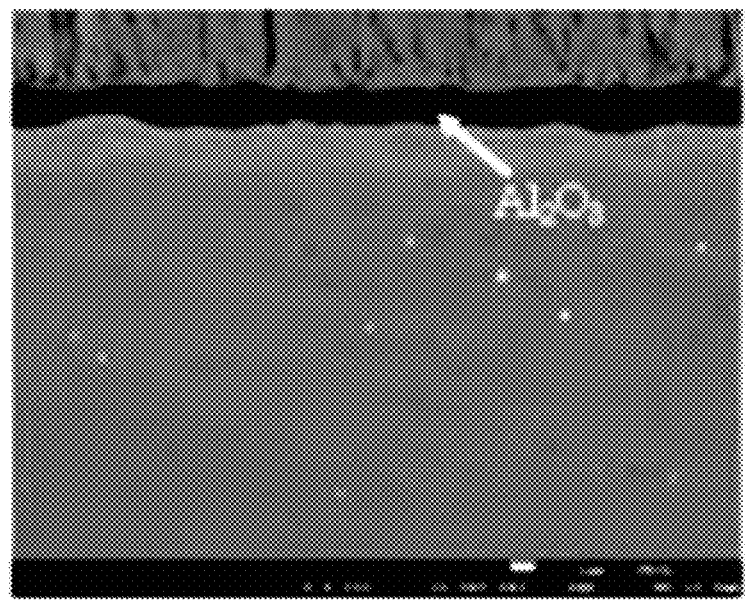
Figure 4:
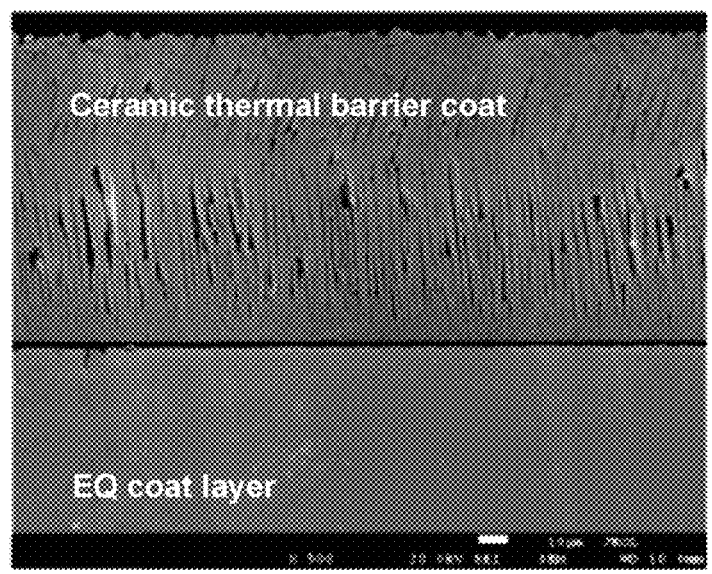
FIG. 4 provides scanning electron microscopic images of a cross section of a sample having undergone an oxidation resistance test, wherein a laminated body created by forming a ceramic thermal barrier layer on a bond coat layer made of an EQ-Ir coat material shown in Example was subjected to 1,135° C. and 100-cycle oxidation resistance test. (A) is an image magnified 500 times, and (B) is an image magnified 4000 times.
Figure 4:
Figure 5:
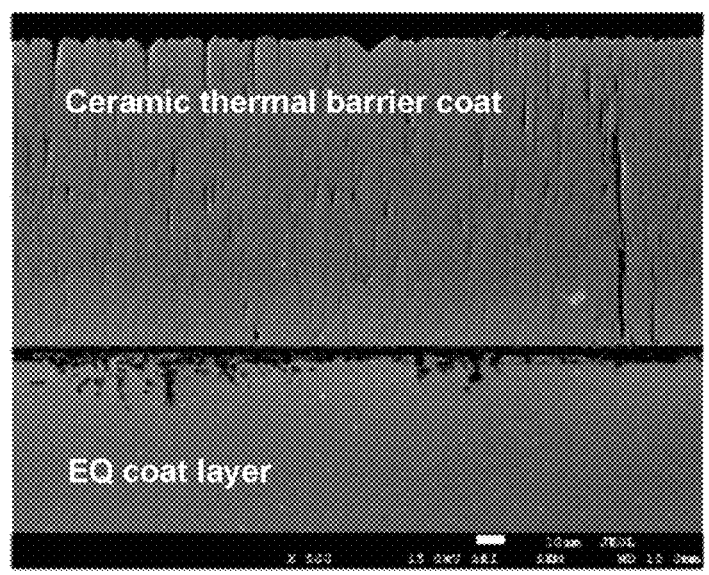
FIG. 5 provides scanning electron microscopic images of a cross section of a sample having undergone an oxidation resistance test, wherein a laminated body created by forming a ceramic thermal barrier layer on a bond coat layer made of an EQ coat material was subjected to 1,135° C. and 100-cycle oxidation resistance test. (A) is an image magnified 500 times, and (B) is an image magnified 4000 times.
Figure 5:
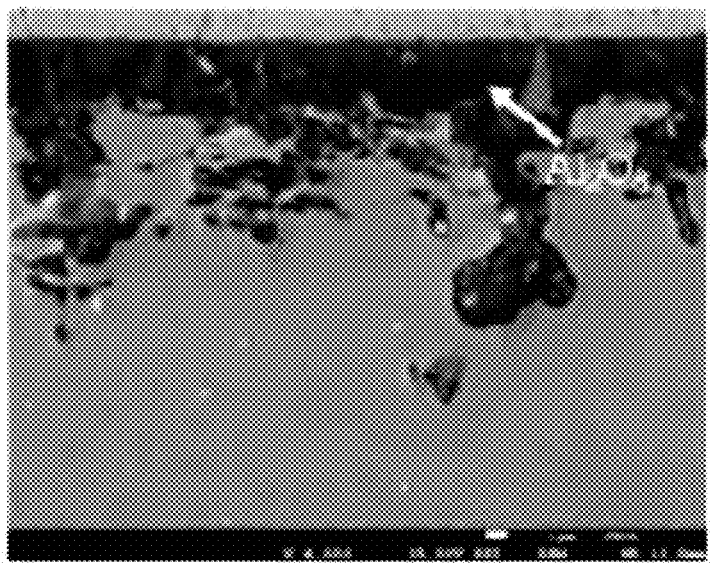

FIGS. 3 to 5 are scanning electron microscopic images of cross sections of samples in proximity to the interface between the ceramic thermal barrier coat layer 3 and the EQ coat layer 2' obtained after 1,135° C. one-hour tests were performed for 100 cycles using three types of samples coated with the ceramic thermal barrier coat described above. Note that (A) in each of FIGS. 3 to 5 is an image magnified 500 times, and (B) is an image magnified 4000 times.

Between the ceramic thermal barrier coat layer 3 and the bond coat layer 2' made of EQC-Pt coat material (FIG. 3) or EQC-Ir coat material (FIG. 4), generation of homogeneous layer X of approximately 2 μm was observed. Meanwhile, between the ceramic thermal barrier coat layer 3 and the bond coat layer 2' made of the EQC material, generation of irregular island-like layer Z toward the inside of the bond coat layer was observed (FIG. 5) along with a layer of approximately 3 μm, which was inhomogeneous.

Figure 6:
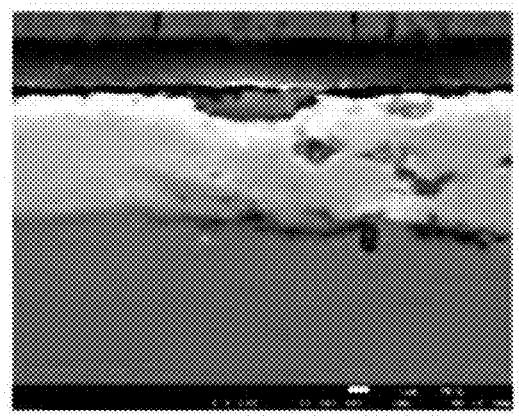
FIG. 6 provides magnified images of the proximity of the interface between the EQ-Pt coat layer and the ceramic thermal barrier coat layer of a sample having undergone an oxidation resistance test, wherein a laminated body created by forming a ceramic thermal barrier layer on a bond coat layer made of EQ-Pt coat material of the present invention was subjected to 1,135° C. and 100-cycle oxidation resistance test. (A) is an image showing a microstructure, (B) is an image showing Al distribution status, and (C) is an image showing O (oxygen) distribution status.
Figure 6:
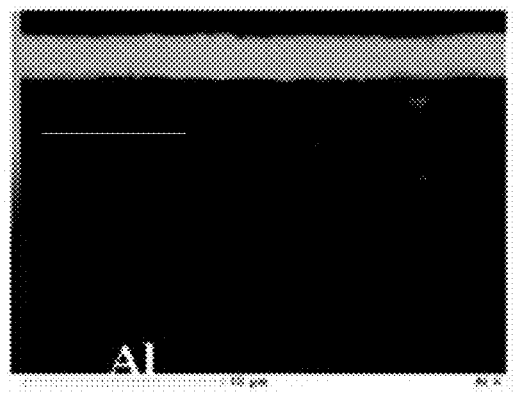
Figure 6:
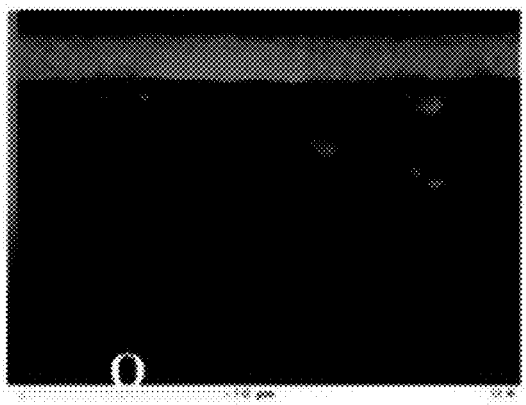
Figure 7:
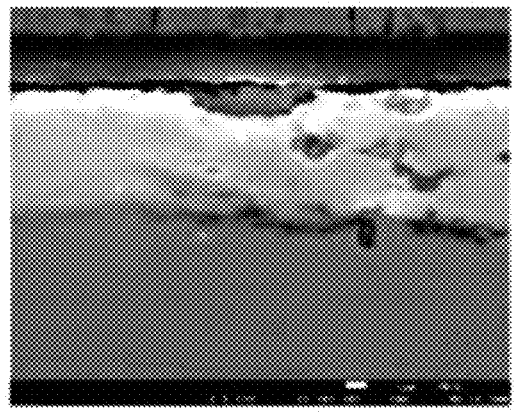
FIG. 7 provides magnified images of the proximity of the interface between the EQ-Ir coat layer and the ceramic thermal barrier coat layer of a sample having undergone an oxidation resistance test, wherein a laminated body created by forming a ceramic thermal barrier layer on a bond coat layer made of EQ-Ir coat material of the present invention was subjected to 1,135° C. and 100-cycle oxidation resistance test. (A) is an image showing a microstructure, (B) is an image showing Al distribution status, and (C) is an image showing O distribution status.
Figure 7:
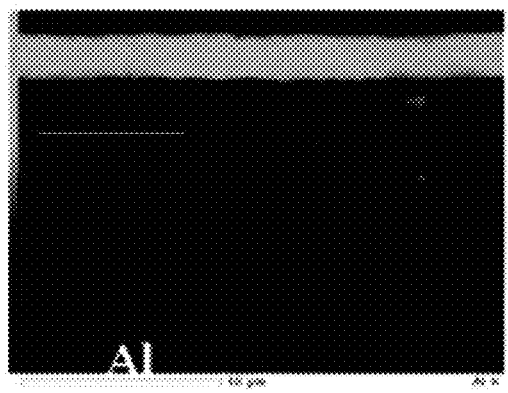
Figure 7:
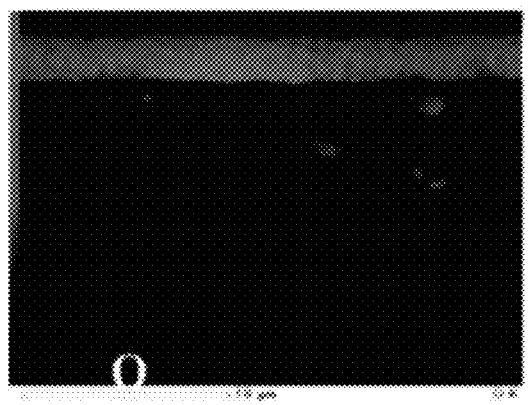
Figure 8:
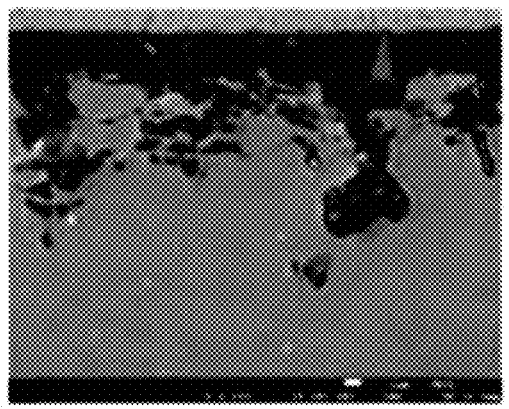
FIG. 8 provides magnified images of the proximity of the interface between the EQ coat layer and the ceramic thermal barrier coat layer of a sample having undergone an oxidation resistance test, wherein a laminated body created by forming a ceramic thermal barrier layer on a bond coat layer made of EQ coat material in Comparative Example was subjected to 1,135° C. and 100-cycle oxidation resistance test. (A) is an image showing a microstructure, (B) is an image showing Al distribution status, and (C) is an image showing O distribution status.
Figure 8:
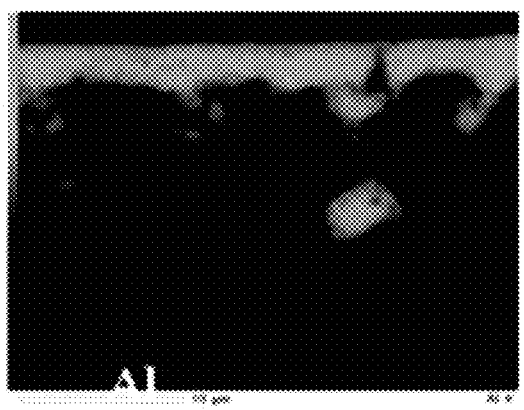
Figure 8:
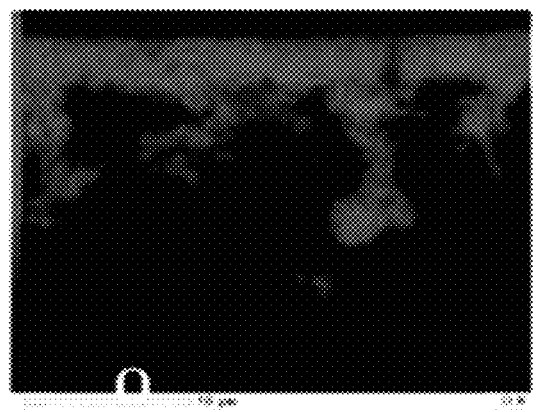

FIGS. 6 to 8 show element distribution on the cross section of the samples shown in FIGS. 3 to 5.

FIG. 6 (A) corresponds to FIG. 3, and FIG. 6(B) and FIG. 6(C) respectively show the distribution of Al and that of O on the cross section of the sample shown in FIG. 6(A).

FIG. 7(A) corresponds to FIG. 4, and FIG. 7(B) and FIG. 7(C) respectively show the distribution of Al and that of O on the cross section of the sample shown in FIG. 7(A).

FIG. 8(A) corresponds to FIG. 5, and FIG. 8(B) and FIG. 8(C) respectively show the distribution of Al and that of O on the cross section of the sample shown in FIG. 8(A).

Between the ceramic thermal barrier coat layer and the EQC-Pt bond coat layer (FIG. 6) or the EQC-Ir bond coat layer (FIG. 7), generation of a layer wherein Al and O were distributed homogeneously was observed. Meanwhile, between the ceramic thermal barrier coat layer and the EQC bond coat layer (FIG. 8), generation of an island-like layer wherein Al and O were distributed was also observed along with a belt-like layer wherein Al and O were distributed.

From the observation result of the microstructure in proximity to the interface between the EQ coat material and the thermal barrier ceramic coat material shown in FIGS. 3 to 8, a homogeneous $Al_2O_3$ layer is assumed to have been formed between the Pt-EQC or Ir-EQC bond coat layer and the ceramic thermal barrier coat layer as a stable interface during high-temperature cycles in the air, and thus highly stable heat resistance property was exhibited even during long-term high-temperature cycles. Meanwhile, since a stable $Al_2O_3$ layer is not formed between the bond coat layer not containing Pt or Ir and the ceramic thermal barrier coat layer, heat resistance property is considered to be inferior.

As apparent from the example, with the Ni-based superalloy component of the present invention, in the presence of air, even at a high temperature of 1,135° C. or higher, the stability of the interface between the bond coat layer containing Pt and/or Ir and the ceramic thermal barrier coat layer is maintained during high-temperature cycles thanks to the $Al_2O_3$ layer generated. Since the bond coat layer and the Ni-base superalloy substrate are in a state of near-equilibrium, elemental interdiffusion that occurs in proximity to the interface is suppressed, and high-temperature stability is also maintained in proximity to the interface. The Ni-based superalloy component in three-layer structure made up of the Ni-base superalloy substrate, bond coat layer containing Pt and/or Ir, and ceramic thermal barrier coat layer has thus allowed high-temperature-cycle durability to be improved significantly.

What is claimed is:
1. A Ni-based superalloy component, comprising:
a Ni-base superalloy consisting essentially of Co, Cr, Mo, W, Al, Ta, Hf, Re, Ru and Ni, and
a bond coat layer formed on a Ni-base superalloy substrate, the bond coat layer having a chemical composition that does not allow interdiffusion to occur, wherein the bond coat layer has Co, Cr, Mo, W, Al, Ta, Hf, Re, Ru, Ni, and Pt or Ir or both of Pt and Ir, and the total amount of Pt and Ir is equal to or higher than 0.2% but not exceeding 15% by mass.

* * * * *